May 26, 1936.    E. J. POITRAS ET AL    2,041,952

MOTION REPRODUCING UNIT

Filed Nov. 21, 1935

INVENTORS
Edward J. Poitras
James D. Tear
BY
THEIR ATTORNEY

Patented May 26, 1936

2,041,952

UNITED STATES PATENT OFFICE 2,041,952

MOTION REPRODUCING UNIT

Edward J. Poitras, Jackson Heights, and James D. Tear, Great Neck, N. Y., assignors to Ford Instrument Company, Inc., Long Island City, N. Y., a corporation of New York Application November 21, 1935, Serial No. 50,900

4 Claims. (Cl. 172—239)

The invention herein disclosed relates to a motion reproducing unit in which the movement of one object, a motion receiving member, is reproduced by another object, the latter object being driven by a prime mover.

In certain of the units of this type, the prime mover is controlled by relatively movable cooperating control elements under the joint influence of the motion receiving and driven members and the prime mover. The prime mover acts on one of the control elements through the displacement of a member against the action of resilient positioning means so that in the steady state condition the control element is affected in accordance with the velocity of the prime mover, and the prime mover assumes a velocity proportional to the velocity of the motion receiving member. As heretofore constructed, the displacement of the control element affected by the prime mover places an appreciable reaction torque upon the motor so that the power available for useful work and the maximum velocity and acceleration of the motor are diminished. In order to secure the most satisfactory operation of the units so constructed, the arrangement has to be substantially friction free and the control mechanism very delicate.

By the present invention, units of this type may be so constructed that stray friction has a minimum effect on the control mechanism actuated in accordance with a derivative of the position of the prime mover and that the control mechanism does not place any appreciable reaction torque upon the motor. The elements entering into the mechanism for affecting the relation of the control elements can, therefore, be made much more substantial than before, and yet the full torque of the prime mover is available for operating the driven member.

In accordance with the invention, the relation of the control elements is effected in accordance with a combination of the position, and first and second derivatives of the position, i. e. the position, velocity and acceleration of the prime mover. In a specific instance, this result is obtained by differentially connecting to the prime mover a rotatably mounted means for displacing the control element in accordance with the speed thereof and a rotatably mounted inertia element.

A unit of this type is disclosed in the accompanying drawing and described in detail below.

Figure 1:
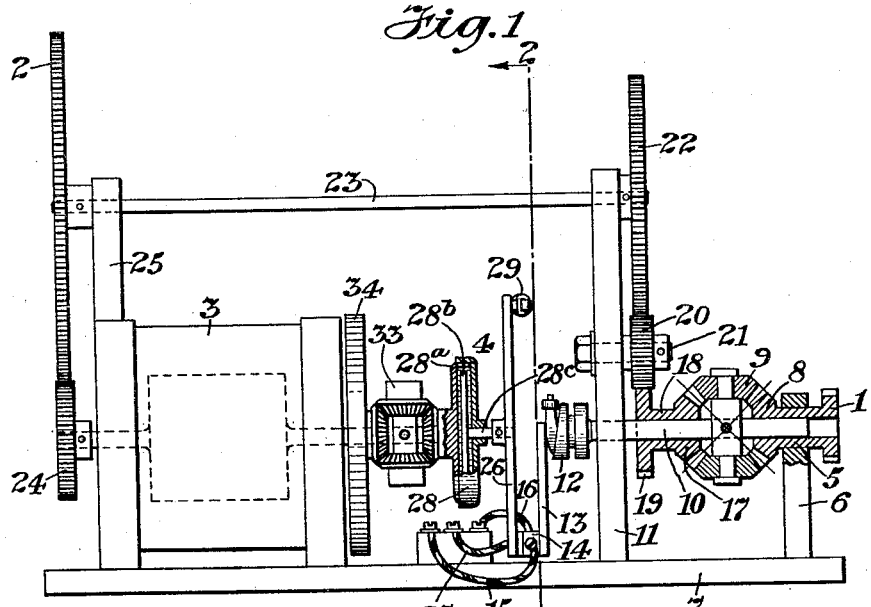
Fig. 1 is a side elevation of the unit.

Essentially, the motion reproducing unit illustrated in the drawing consists of a motion receiving member, which is shown as a spur gear 1 that may be connected to any member, the motion of which it is desired to reproduce; a driven member which is represented in the drawing as a gear 2 that may be connected to any object to be driven; a reversible electric motor 3 for driving the driven member; and control means for the electric motor designated generally by the numeral 4.

The motion receiving member or gear 1 is formed on the end of a hub 5 that is journaled in a bearing bracket 6 which extends laterally from a base 7 on which all of the mechanism of the unit is mounted. On the other end of the hub 5, there is formed a bevel gear 8 that forms one side of a differential. The center or spider 9 of the differential is mounted upon and secured to a shaft 10 that is journaled in the hub 5 and a bearing bracket 11 through which the shaft extends. Through a yieldable cam drive 12, the shaft 10 actuates an electrical contact arm 13 having a bifurcated, laterally extending end section 14 made of electrical insulating material, each arm of which carries an electric contact, 14a and 14b, insulated from each other and connected to lead wires 15 and 16.

The contact arm 14 is moved in accordance with the relative movement between the motion receiving and driven members by connecting the driven member to one side of the differential to which the motion receiving member 5 is connected. This connection is effected through a bevel gear 17 that is formed on one end of a hub 18 and which constitutes one side of the differential. The hub 18 is journaled on the shaft 10 and a spur gear 19 formed on the other end of the hub 18 meshes with an idler 20 rotatable on a stub shaft 21 secured in the bracket 11. The idler is also in mesh with a gear 22 secured upon one end of a shaft 23 that carries, on its other end, the gear 2 which represents the driven member and which meshes with a gear 24 on the shaft of the motor 3. The shaft 23 is journaled in the bearing bracket 11 and a bearing bracket 25 extending from the frame of the motor 3. Thus, the movements of the shaft 10 and the contact arm 14 are in accordance with the differences in movement between the motion receiving and driven members.

Figure 2:
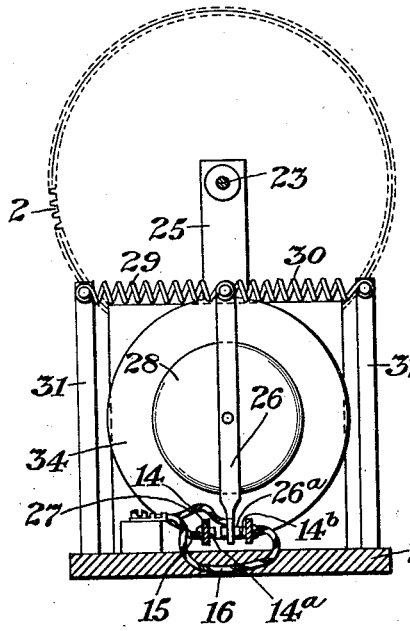
Fig. 2 is a sectional end elevation taken along the line 2—2 of Fig. 1.

The contacts 14a and 14b of the contact arm 14 cooperate with a contact 26a mounted in a contact arm 26. The contact 26a is positioned between the contacts 14a and 14b so that when the contact arm 14 moves clockwise, as seen in Fig. 2, the contact 14b engages the contact 26a and when the contact arm 14 moves counterclockwise, the contact 14a engages the contact 26a. The contact 26a is connected to a flexible lead 27; and the leads 15, 16 and 17 are connected to the line and to the motor so that when the contact 26a engages the contact 14a the motor operates in one direction and in the opposite direction when the contact 26a is engaged by the contact 14b. The direction of movement of the arm 14, therefore, determines the direction of the operation of the motor.

To prevent oscillation or hunting of the motor, and to maintain positional agreement between the movable and driven members, the relation of the contacts controlling the motor is affected in accordance with the operation of the motor. This is accomplished through the contact arm 26 which, in the unit disclosed, is displaced from its neutral position in accordance with a combination of the position, and first and second derivatives of the position, of the motor.

The contact arm 26 is mounted upon and secured to the shaft 28c of a drag device 28. Centering springs 29 and 30 secured to the contact arm 26 and standards 31 and 32 respectively serve to center the contact arm. The drag device consists of a closed case 28a having a quantity of viscous fluid such as oil therein and a disk 28b mounted in the case and secured on the end of the shaft 28c that extends into the case through one side thereof. The case 28a of the drag device is connected to one side of a differential 33 and the other side of the differential is connected to an inertia element 34 rotatably mounted on the shaft of the motor. The center or spider of the differential is connected to the shaft of the motor for rotation therewith.

Upon the operation of the motion receiving member 1, the contact 14b engages the contact 26a as seen in Figure 2 of the drawing. The motor 3 is thus caused to operate in a direction to offset, through the differential, the effect of movement of the gear 1. The qualitative displacement of the control elements during the operation of the device is as follows: At the beginning of a transient motion of the motor, the drag device starts to rotate in proportion to the motor and the control element 26 starts toward its steady state position in angular correspondence with the case of the drag device. For larger motions of the case of the drag device, but while the reactive force of the case is still predominantly due to the inertia of the case rather than the viscous drag effect, the motion of the control element is according to the first derivative of the motor position. Considering the inertia of the inertia device to be much greater than the drag device, the motion of the control element is in accordance with each of these factors as a function position during constant conditions of acceleration. Thus, the control element moves in accordance with the position, and the first and second derivatives of position, of the motor. The magnitude of the motion of the control element in accordance with each of these factors as a function of time is of course dependent upon the choice of constants.

Figure 3:
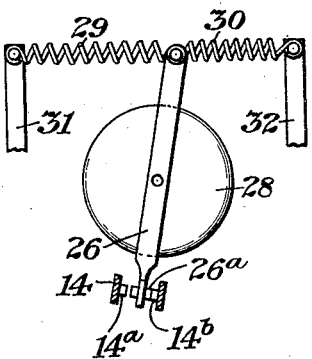
Fig. 3 is an end elevation of the electrical contact elements and illustrates the relation of the contacts under one condition of operation of the unit.

It will be seen that under the condition of constant velocity no motion will be transmitted to the drag device and the contacts will assume the position shown in Fig. 2, in which position the motion receiving and the driven members are in positional agreement. Under the condition of constant acceleration, the controls will assume the position shown in Fig. 3, under which condition the lag between the motion receiving member and the driven member is proportional to the acceleration.

A unit of the type described is stable in operation without appreciable lag of the driven member behind the motion receiving member under normal conditions. The control mechanism for securing stability does not require any power at steady speeds; it is substantially independent of friction; and there is no restriction, for all practical purposes, on the strength of the drag device and the centering springs. This latter feature permits the use of stronger centering springs than could heretofore be used and reduces to a negligible amount the working contact pressure error and the error due to friction in the drag device. The arrangement also acts as a filter, to smooth out rapid changes in velocity.

It is obvious that various changes may be made, by those skilled in the art, in the details of the embodiment of the invention illustrated in the accompanying drawing and described above within the principle and scope of the invention as expressed in the appended claims.

We claim:

1. In a unit of the type described, the combination comprising a movably mounted motion receiving member, a movably mounted driven member, a prime mover for driving the driven member and control means for the prime mover including two relatively movable cooperating control elements, means for effecting relative movement of the control elements upon relative movement between the motion receiving and driven members and means for affecting one of said control elements including an inertia element, means for displacing the control element proportional to velocity and means differentially connecting said inertia element and said displacing means to the prime mover.

2. In a unit of the type described, the combination comprising a movably mounted motion receiving member, a movably mounted driven member, a prime mover for driving the driven member and control means for the prime mover including two relatively movable cooperating control elements, means for effecting relative movement of the control elements upon relative movement between the motion receiving and driven members and means for affecting one of said control elements to affect the operation of the prime mover comprising a rotatably mounted inertia element, rotatably mounted means for displacing the control element in accordance with the rotation thereof, and means differentially connecting the inertia element and said rotatably mounted control element displacing means to the prime mover.

3. In a unit of the type described, the combination comprising a movably mounted motion receiving member, a movably mounted driven member, a prime mover for driving the driven member and control means for the prime mover including two relatively movable cooperating control elements, means for effecting relative movement of the control elements upon relative movement between the motion receiving and driven members and means for affecting one of said control elements to affect the operation of the prime mover comprising a rotatably mounted inertia element, rotatably mounted means for displacing the control element in accordance with the velocity thereof including a viscous drag, and means differentially connecting the inertia element and the rotatably mounted control element displacing means to the prime mover.

4. In a unit of the type described, the combination comprising a movably mounted motion receiving member, a movably mounted driven member, an electric motor for driving the driven member and control means for the electric motor including two relatively movable, cooperating, electrical contact elements, means for effecting relative movement of the contact elements upon relative movement between the motion receiving and driven members, centering springs acting on one of said contact elements, and means for affecting said contact element to affect the operation of the prime mover comprising a rotatably mounted inertia element, rotatably mounted means for displacing the contact element in accordance with the velocity thereof including a viscous drag, means differentially connecting the rotatably mounted displacing means and inertia element to the prime mover.

EDWARD J. POITRAS.
JAMES D. TEAR.

CERTIFICATE OF CORRECTION.

Patent No. 2,041,952.  May 26, 1936.

EDWARD J. POITRAS, ET AL.

It is hereby certified that error appears in the printed specification of the above numbered patent requiring correction as follows: Page 2, first column, line 65, for the words and syllable "each of these factors as a func-" read the second derivative of motor; and that the said Letters Patent should be read with this correction therein that the same may conform to the record of the case in the Patent Office.

Signed and sealed this 15th day of December, A. D. 1936.

Henry Van Arsdale (Seal) Acting Commissioner of Patents.